United States Patent
Campo Camacho et al.

(10) Patent No.: US 7,532,865 B2
(45) Date of Patent: May 12, 2009

(54) OUTER LOOP POWER CONTROL METHOD AND DEVICE FOR WIRELESS COMMUNICATIONS SYSTEMS

(75) Inventors: Alfonso Campo Camacho, Madrid (ES); Miguel Blanco Carmona, Madrid (ES); Luis Mendo Tomas, Madrid (ES); José M Hernando Rabanos, Madrid (ES); Alvaro Lopez Medrano, Madrid (ES)

(73) Assignee: T.O.P. Optimized Technologies, S.L. (ES)

( * ) Notice: Subject to any disclaimer, the term of this patent is extended or adjusted under 35 U.S.C. 154(b) by 516 days.

(21) Appl. No.: 11/293,287

(22) Filed: Dec. 1, 2005

(65) Prior Publication Data

US 2007/0042719 A1    Feb. 22, 2007

(30) Foreign Application Priority Data

Aug. 17, 2005   (ES) .............................. 200502057

(51) Int. Cl.
    *H04B 1/00*     (2006.01)
    *H04B 7/00*     (2006.01)

(52) U.S. Cl. .................... 455/69; 455/522; 455/68; 455/70; 370/318; 370/320

(58) Field of Classification Search ................. 455/522, 455/126, 127.1, 114.2, 226.3, 296, 13.4, 455/69, 11.1, 68, 70; 370/318, 320
See application file for complete search history.

(56) References Cited

U.S. PATENT DOCUMENTS

2003/0148769 A1*   8/2003   Chi et al. ..................... 455/453

* cited by examiner

*Primary Examiner*—Tuan A Pham
(74) *Attorney, Agent, or Firm*—Ostrolenk, Faber, Gerb & Soffen, LLP

(57) ABSTRACT

The method and device proposed for wireless communications systems based on WCDMA technology modifies the desired signal to interference ratio target ($SIR_{target}$) when it detects the exit from the wind-up condition in the mobile communication, that is, when the unwinding process has started, in order to match it to the outer loop power control in normal mode, setting for this desired signal to interference ratio target ($SIR_{target}$) a value that is as close as possible to that which it had just before the moment of the start of the wind-up so that immediate afterwards it can continue with the correct variation determined by the power control in the normal mode of the outer loop. Thus, the unwinding time is shortened and the interference in the mobile communication system is reduced, while its capacity and the quality of its wireless connections are increased.

12 Claims, 4 Drawing Sheets

400

100

200

300

400

OUTER LOOP POWER CONTROL METHOD AND DEVICE FOR WIRELESS COMMUNICATIONS SYSTEMS

CROSS REFERENCE TO RELATED APPLICATIONS

The present application claims priority under 35 U.S.C § 119 of Spanish patent application Ser. No. 200502057 filed on Aug. 17, 2005, incorporated herein by reference.

OBJECT OF THE INVENTION

This invention has its application within the telecommunications sector and, especially, in the industry dedicated to the manufacture of both base and mobile stations in cellular infrastructures for wireless communications systems.

More specifically, the invention described here refers to a communications method and device for an outer loop power control system in a mobile cellular telephone network.

One purpose of the invention is to allow power control using the outer loop that includes the detection of the normal, wind-up and unwinding operational modes of the outer loop and, in the last, unwinding mode, anticipates the suitable alteration of the target signal/interference ratio to quickly adapt to the outer loop power control function in normal mode.

Reducing the convergence time of the outer loop power control when it exits the wind-up mode and preventing unnecessary interference that reduces the capacity of a wireless communication system when the inevitable wind-up and unwinding phenomena occur are also objectives of the invention.

BACKGROUND OF THE INVENTION

In Jan. 1998 the European Telecommunications Standards Institute (ETSI) chose the basic technology for the Universal Mobile Telecommunications System (UMTS) (see ETSI, "The ETSI UMTS Terrestrial Radio Access (UTRA) ITU-R RTT Candidate Submission," June 1998). The main proposed radio interface was the Wideband Code Division Multiple Access (WCDMA) protocol, the features of which offer the opportunity for fully meeting the requirements of third generation (3G) mobile telephony. Because of the high data transmission rate and the increasingly stringent quality of service (QoS) requirements in 3G, the development of new planning strategies were required. These included the power control system, probably that of greatest study, used to implement the outer loop of the system.

The following describes this power control system in general terms since the operation of the outer loop, for which this invention proposes a method, is the result of other components in the system.

The power control system in cellular networks based on WCMDA is required because the technology is limited by interference since all users share the same frequency spectrum and their codes are not completely orthogonal (see Holma & Toskala: "WCDMA by UMTS, Radio Access for Third Generation Mobile Communications," John Wiley & Sons).

The final purpose of the power control system in WCDMA is to obtain the quality of service required in a specific connection, the downlink from the base station to the mobile or terminal, or the uplink from the mobile to the base station, with a minimum level of transmitted power (the precise aspect on which this invention is centred).

The main objectives of the power control system in WCDMA networks are:

Cancellation of the near/far effect: if all the mobile stations were to transmit at the same power without considering the distance or the fading to the base station, the mobiles closest to it would significantly interfere with the terminals further away.

Protection against severe fading.

Minimising the interference in the network with the consequent improvement in capacity.

Longer battery life in the mobile stations.

There are three procedures for implementing a power control system for WCMDA:

By open loop: During the random access process at the start of a connection, the base/mobile station estimates the power loss in the uplink/downlink and adjusts its and transmission power as a function of this.

By closed or inner loop: also called rapid power control (1500 Hz) which consists of the following three steps:

1) The relevant receiver (the base station or the mobile unit) compares the value of the desired signal to interference ratio received ($SIR_{rec}$) to the desired signal to interference ratio target ($SIR_{target}$) which depends on the quality of service required for this specific connection and which is set by the outer loop procedure, explained below.

2) The same receiver sends power control bits indicating that the power must be increased (if $SIR_{rec} < SIR_{target}$) or reduced (if $SIR_{rec} > SIR_{target}$) by a certain value (normally 1 dB).

3) The transmitter (base or mobile station) increases or decreases its power by the amount set previously.

By outer loop (OLPC, Outer Loop Power Control): this is much slower than the closed loop (10-100 Hz) and sets the desired signal to interference ratio target ($SIR_{target}$) to maintain a pre-set quality objective. One criterion or measurement of the quality of a connection is the frame error rate (FER) or its equivalent, the block error rate (BLER), which is a function of the required signal to interference ratio (SIR). Given that the inner loop helps to maintain the desired signal to interference ratio received ($SIR_{rec}$) close to the target ($SIR_{target}$), the block error rate (BLER) is, in the end, determined by this target value. Thus, to achieve a quality of service in a specific fading environment, the target ($SIR_{target}$) must be adjusted to the value that is suitable for this environment.

Sometimes, either because the channel conditions suddenly worsen, so that the receiver does not receive the power control bits sent by the transmitter, or because the transmitter has reached the maximum power available for this connection, the desired signal to interference ratio received ($SIR_{rec}$) may always be lower than the desired signal to interference ratio target ($SIR_{target}$).

The result of this situation is that the received frame error rate ($FER_{rec}$) is greater than the target frame error rate ($FER_{target}$), that is, that the quality of the connection is degraded. However, this degradation may not be large enough to cut the communication, so that it is maintained albeit with a quality that is less than that desired.

If this occurs—communication continues but at degraded quality—the so-called outer loop wind-up condition or mode may occur: the outer loop power control (OLPC) method will increase the desired signal to interference ratio target ($SIR_{target}$), to try to reach the target quality criterion, that is, the target frame error rate ($FER_{target}$), but the desired signal to interference ratio received ($SIR_{rec}$) will not be able to follow the desired signal to interference ratio target ($SIR_{target}$) for the reasons described above (worsening of the channel's conditions or saturation of the transmitter).

In this situation, the outer loop power control (OLPC) method will continue to increase the desired signal to interference ratio target ($SIR_{target}$) indefinitely to a level much higher than before the sudden worsening of the propagation conditions or the power limitation.

When the conditions subsequently improve or the power limitation disappears, the desired signal to interference ratio received ($SIR_{rec}$) will finally reach the desired signal to interference ratio target ($SIR_{target}$), which will then have a much higher value than that for the target frame error rate ($FER_{target}$). As a result, the received frame error rate ($FER_{rec}$) being achieved at this point will be much less than necessary and, therefore, will be increasing the interference in the channel, reducing capacity and degrading the quality in other connections.

This undesirable situation will be maintained until the outer loop power control (OLPC) method manages to lower the desired signal to interference ratio target ($SIR_{target}$) to a suitable value, that is, to that at which the target frame error rate ($FER_{target}$) is achieved.

This process of lowering the desired signal to interference ratio target ($SIR_{target}$) after the end of the condition described above, that is, after the wind-up, is called the outer loop unwinding condition or mode and this invention proposes a method for specifically this mode.

The problem is that due to the properties of the outer loop power control (OLPC) algorithm used normally (see Holma H, Toskala A, "WCDMA for UMTS," Wiley, 2002), the process of lowering the desired signal to interference ratio target ($SIR_{target}$) is very slow. This slow convergence is because the down step size used by the algorithm is, measured in dB, of the order of the target frame error rate ($FER_{target}$) (typical values are $10^{-2}$ for the voice service and $10^{-3}$ for the video calls service), that is, very small, which means that dozens of seconds are needed for each dB decrease.

It is interesting to note that there is a disparity between the down step size and the up step size of the desired signal to interference ratio target ($SIR_{target}$) fixed by the outer loop power control (OLPC) method. In fact, the up step size is much greater than the down step size: while, as mentioned, the latter is of the order of the target frame error rate ($FER_{target}$) in dB, the up step size is approximately 1 dB. This fact is relevant because it implies that the outer loop power control (OLPC) method can react quickly to situations requiring an increase in the desired signal to interference ratio target ($SIR_{target}$) and this is taken into account in this invention.

Because of the above, various answers have been devised to prevent the outer loop power control phenomenon (see US patent application 2003148769). This document proposes the following method for detecting the wind-up: a wind-up situation is declared when the difference between the desired signal to interference ratio target ($SIR_{target}$) and the desired signal to interference ratio received ($SIR_{rec}$) exceeds a specific margin or threshold. When the wind-up mode is detected, in US 2003148769, different mechanisms are set up to limit the value of the desired signal to interference ratio target ($SIR_{target}$) while the wind-up situation lasts. Finally, also in this patent application, criteria are set for detecting the unwinding process, described above, that is, the end of the wind-up, and that starts when the desired signal to interference ratio received ($SIR_{rec}$) is able to reach the desired signal to interference ratio target ($SIR_{target}$).

However, in the power control described in US 2003148769, no criterion is set for the unwinding process itself, that is, only a possible form for detecting it is defined but no specific operation of the outer loop in this mode is described; it is assumed to match the normal operating mode of this loop or that of a very slow decrease with the resulting increase in interference in the channel, reduction of capacity and deterioration of the quality of other connections, as explained above.

It should be noted that there is a method to prevent the outer loop wind-up from attenuating the later unwinding process, as achieved in the quoted example of US 2003148769, but it does not prevent it.

DESCRIPTION OF THE INVENTION

This invention is intended to solve the problem described above, among others, in all the aspects described.

The proposed outer loop power control method and device for mobile communications systems, especially designed for third generation (3G) technologies based on some of the standard Code Division Multiple Access (CDMA) protocols modifies the desired signal to interference ratio target ($SIR_{target}$) when it has exited the wind-up condition, when the unwinding process has started.

More specifically, using the method and apparatus of the invention, at the start of unwinding, the target ($SIR_{target}$) is made equal to a value suitably close to that which the desired signal to interference ratio target ($SIR_{target}$) had before the start of the wind-up. This suitable value with which the invention sets this desired signal to interference ratio target ($SIR_{target}$) when the outer loop power control enters the unwinding mode is as close as possible to the value set for the desired signal to interference ratio target ($SIR_{target}$) just before it entered the wind-up condition, so that immediately after the outer loop unwinding state ends, the power control follows the variation determined in normal mode.

This suitable changing of the desired signal to interference ratio target ($SIR_{target}$) by the invention when unwinding starts in the outer loop power control (OLPC) quickly matches the target ($SIR_{target}$) and, therefore, the power to the outer loop in normal mode.

The reason for changing the desired signal to interference ratio target ($SIR_{target}$) at the start of the outer loop unwinding situation and making it equal to its closest possible value at the start of the wind-up mode is because, from the start of these wind-up and later unwinding phenomena, the conventional outer loop power control (OLPC) starts to operate defectively. In reality, since wind-up is detected until it ends, the outer loop power control (OLPC) is not allowed to operate in normal mode, that is, the desired signal to interference ratio target ($SIR_{target}$) is not increased indefinitely. What this invention proposes for the outer loop power control method when it exits wind-up, that is, at the start of unwinding, is to change the desired signal to interference ratio target ($SIR_{target}$), making it equal to a value as close as possible to its value when the outer loop power control (OLPC) itself ceases to operate in normal mode, that is, just before it enters wind-up.

One aspect of the invention is therefore an outer loop power control method for wireless communications systems which, based on the data signal received from the base or mobile station, involves the following phases:

i) Estimating the desired signal to interference ratio received ($SIR_{rec}$) based on the data signal from a base or mobile station.

ii) Setting the desired signal to interference ratio target ($SIR_{target}$) that is close to the desired signal to interference ratio required ($SIR_{req}$) during the normal mode of the outer loop.

iii) Detecting the start of the outer loop wind-up mode.

iv) Setting a desired signal to interference ratio target ($SIR_{target}$) during the outer loop wind-up state.

v) Detecting the start of the outer loop unwinding mode.

vi) Changing the ratio of the signal required to interference ($SIR_{target}$) at the start of the outer loop unwinding, to thus finally match it to the outer loop power control in normal mode.

As a result of the new unwinding mechanism that this invention proposes in the outer loop power control method, the desired signal to interference ratio target ($SIR_{target}$) thus established at the start of this condition will be as closely as possible equal to the desired signal to interference ratio target ($SIR_{target}$), suitable for the new propagation conditions, that is, to that which satisfies the relevant target frame error rate ($FER_{target}$).

Thus, the invention presents a notable improvement over that described in the above mentioned patent application US 2003148769, by considerably reducing the duration time of the unwinding process and, thus, reducing the interference in the communications channel, thus increasing its capacity and the quality of the other connections.

Another aspect of the invention refers to a device for outer loop power control for wireless communications systems that consists of at least one programmable electronic device that operates according to the method described above. The programmable electronic device could be a general purpose processor, a digital signal processor (DSP), an application-specific integrated circuit (ASCI), a programmable card (FPGA) or any combination of these. The general purpose processor could preferably be a microprocessor or other alternatives: a conventional processor, a micro-controller or any general states machine. The programmable electronic device could even consist of a combination of multiple microprocessors, a microprocessor and one or more DSP devices, or any other configuration in which the running of the phases is distributed, in series or in parallel, included in the method described.

Optionally, the proposed outer loop power control device for wireless communications systems could consist of a radio receiver that can receive data signals from the base or mobile station. Additionally, the device could also include a radio transmitter capable of sending the power control information to the relevant base or mobile station. Thus, this outer loop power control device could be built into a wireless communications network controller, or in the user's terminal or mobile in the wireless communications systems.

Some final aspects of the invention involve a radio network controller (RNC) that includes the logic for processing the calls and a mobile station (UE: user equipment or remote terminal), with each device including the outer loop power control device for wireless communications systems as described.

The invention can be applied to any wireless communications system that supports one or more CDMA protocol standards such as WCDMA, IS-95, CDMA2000, the HDR specification, etc.

DESCRIPTION OF THE DRAWINGS

To complement this description and to aid the better understanding of the properties of the invention, according to a preferred example of its practical undertaking, this description is accompanied by a set of drawings that form an integral part of it to illustrate and not limit it, showing the following.

PREFERRED EMBODIMENT OF THE INVENTION

Figure 1:
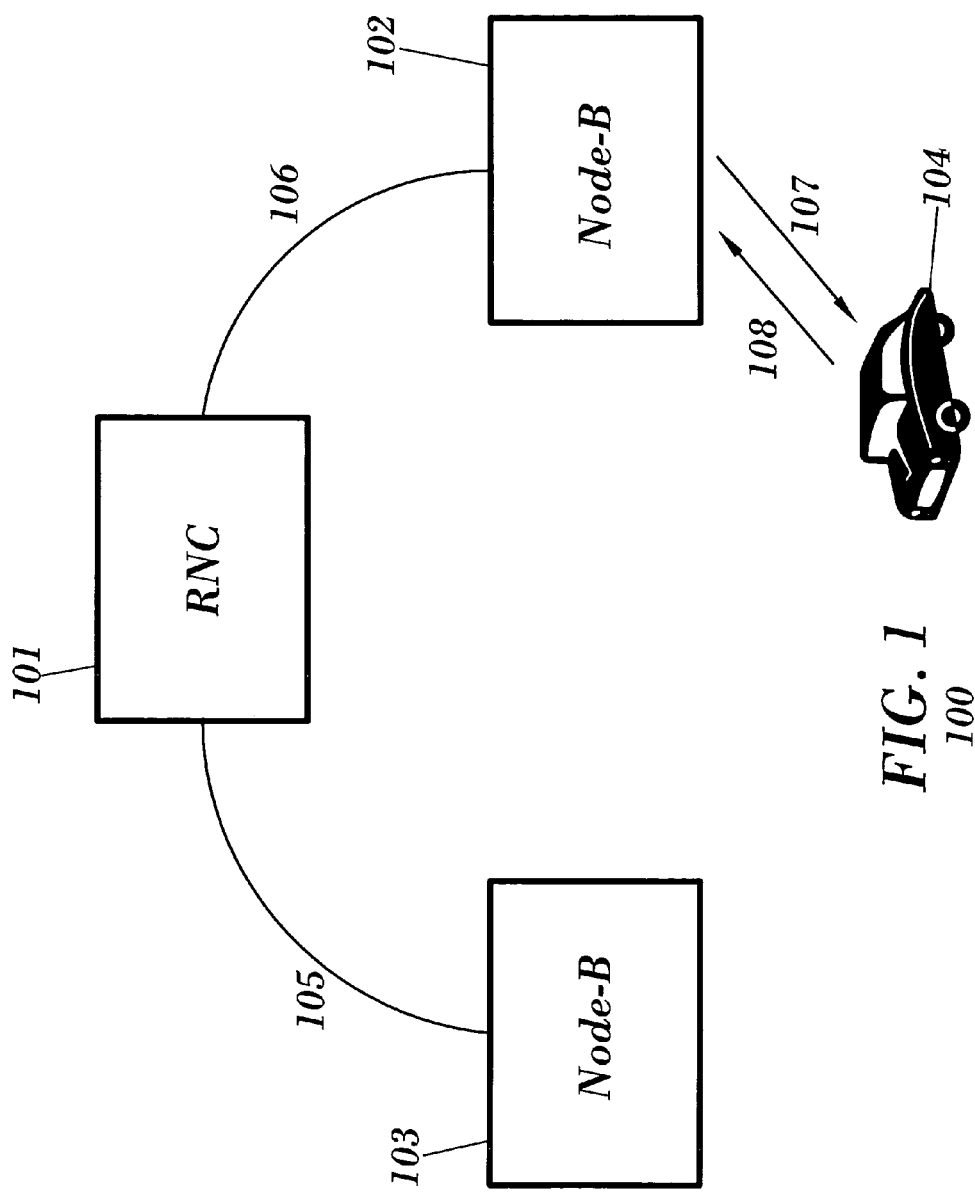
FIG. 1. Shows part of a mobile communications system, according to the known state of the art, that includes the parts of a cellular infrastructure, mobile user terminal, base station and remote network controller, relating to the object of the invention.

FIG. 1 shows a part (100) of a WCDMA mobile communications system. Apart from the invention, the parts shown in the figure are well known and are not described in detail: one part of interest is the user terminal or mobile station (104), shown by the vehicle icon; the WCDMA mobile communications system also consists of various base stations (102, 103) or B-nodes in the UMTS network, that contain processors, memories, interface cards and embedded software. This part of the system includes a radio network controller (101) or RNC, which, among other functions, provides the call processing. The two base stations (102, 103) and the mobile station (104) represent the end points of the wireless interface. Each base station (102, 103) is associated with an RNC (101) via land lines (105, 106). In the following, it is assumed that the mobile station (104) is communicating with the base station (102) via the downlink data signal (107) and the uplink data signal (108).

Figure 2:
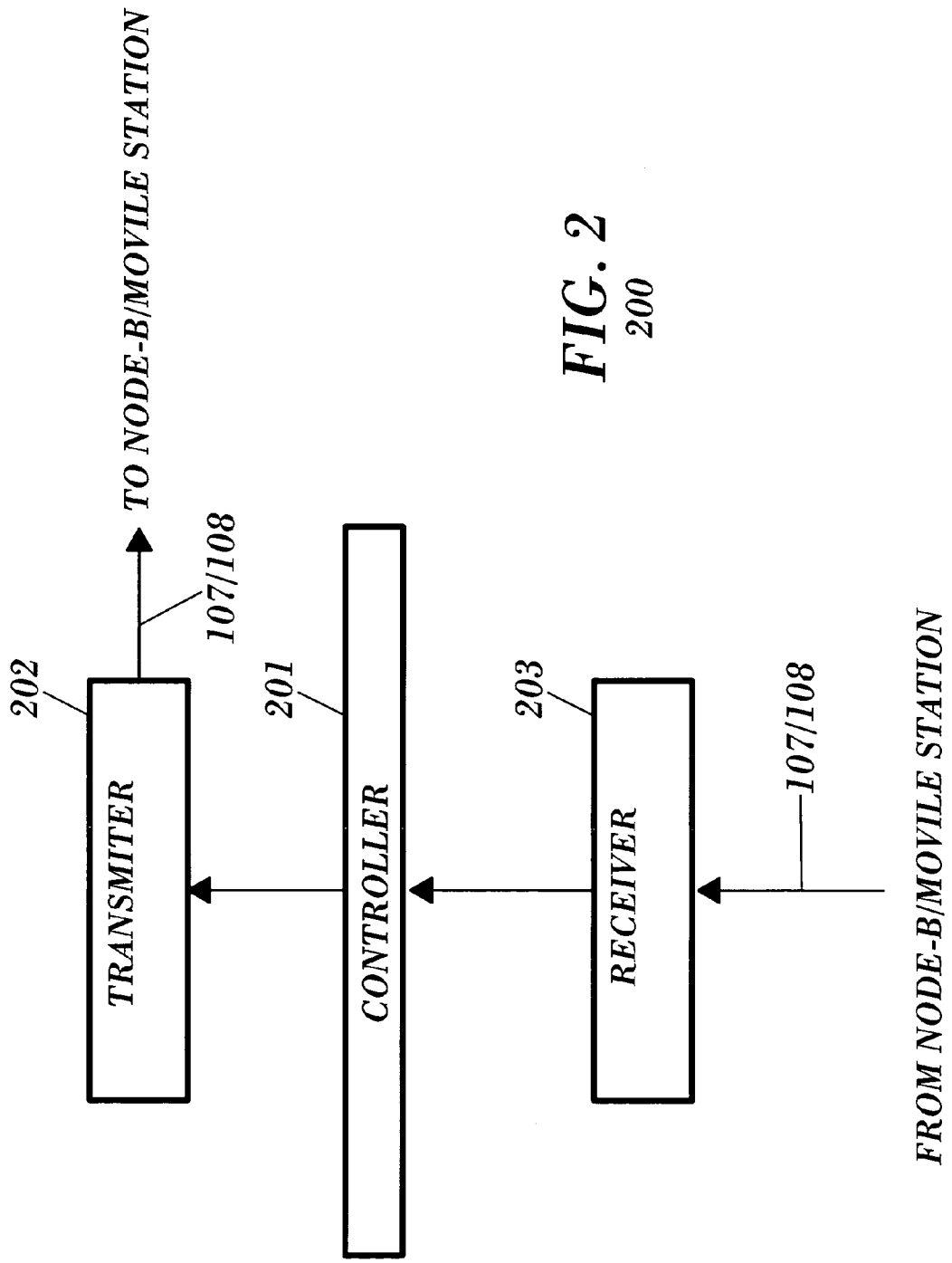
FIG. 2. Shows a block diagram according to the state of the art, of the part of a base or mobile station with which the invention is concerned.

FIG. 2 shows the part (200) of both stations, base station (102) and mobile (104), that includes the principles on which this invention is based. The known aspects of the elements shown in the figure are not described since a radio transmitter (202) and receiver (203) are described in detail in the state of the art. Both the base station (102) and the mobile (104) contain a controller (201), a transmitter (202) and a receiver (203). Thus, in the case of the base station (102), the signal received is the uplink (108) and in the case of the mobile (104), the signal received is the downlink (107). Both reach the controller (201) via the receiver (203). The power control device that forms the object of the invention is built into the controller (201) and sends a command via the transmitter (202) that indicates to the receiver station at the time that it increases or reduces its power, depending on the result of the outer loop power control method described below, in order to set the desired signal to interference ratio target ($SIR_{target}$) that acts as the threshold in the closed power control loop.

The outer loop power control method of the invention includes mechanisms to detect the wind-up situation, so that once it is detected, the outer loop abandons the normal mode and passes top operation in wind-up mode, as can be seen in FIGS. 7 and 8 of the prior patent application US2003148769, using outer loop power control algorithms known in the different situations: normal mode and wind-up.

Likewise, the method that forms the object of the invention includes mechanisms to detect the end of this wind-up phenomenon, that coincide, for the definition given earlier, with the start of the unwinding process.

Figure 3:
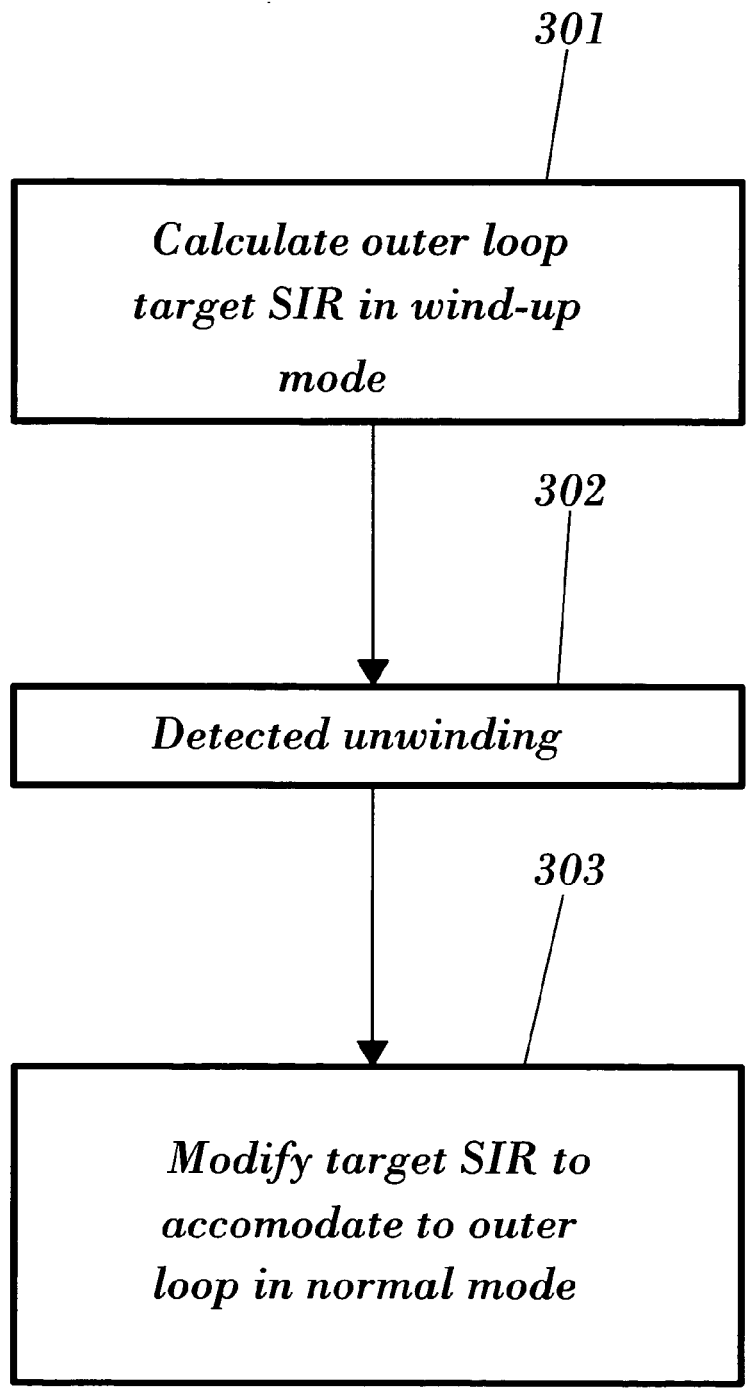
FIG. 3. Shows a block diagram with the steps taking place in the base or mobile station controller shown in the previous figure and that correspond to the unwinding method that is the object of the invention.

Following the progress of these phenomena, after abandoning normal mode and in order to return to the power level that gives a desired signal to interference ratio target ($SIR_{target}$) that is suitable for outer loop power control in normal mode, the steps that take place, in accordance with that which forms the object of the invention, in the controller (201) are those shown in the diagram (300) in FIG. 3. The desired signal to interference ratio target ($SIR_{target}$) in wind-up mode is calculated in the block (301), using known algorithms; next, an unwinding detector (302) is able to determine the end of the wind-up and the start of the unwinding, and the modification of the desired signal to interference ratio target ($SIR_{target}$) takes place in the final block (303), so that it arrives at a value that is suitable for the outer loop power control operating in normal mode. The modification of this desired signal to interference ratio target ($SIR_{target}$) at the start of the unwinding is the object of this invention and is shown in FIG. 4, explained below.

At the start of the unwinding condition in the evolution of the power control in time, this starting point being detected as the end of the wind-up condition and also previously detected by a known mechanism such as that described in patent application US2003148769, the method that forms the object of the invention changes the desired signal to interference ratio target ($SIR_{target}$), giving it a value that is equal or as close as possible to the original value (401) that it had just before the moment that the outer loop wind-up started (402). This value (401) is the last correct value of the desired signal to interference ratio target ($SIR_{target}$) set before stopping the running of the outer loop power control in normal mode, so that immediately after the wind-up situation is left, the variation of the desired signal to interference ratio target ($SIR_{target}$) continues and, therefore, that of the power level determined by the normal mode of the outer loop.

Figure 4:
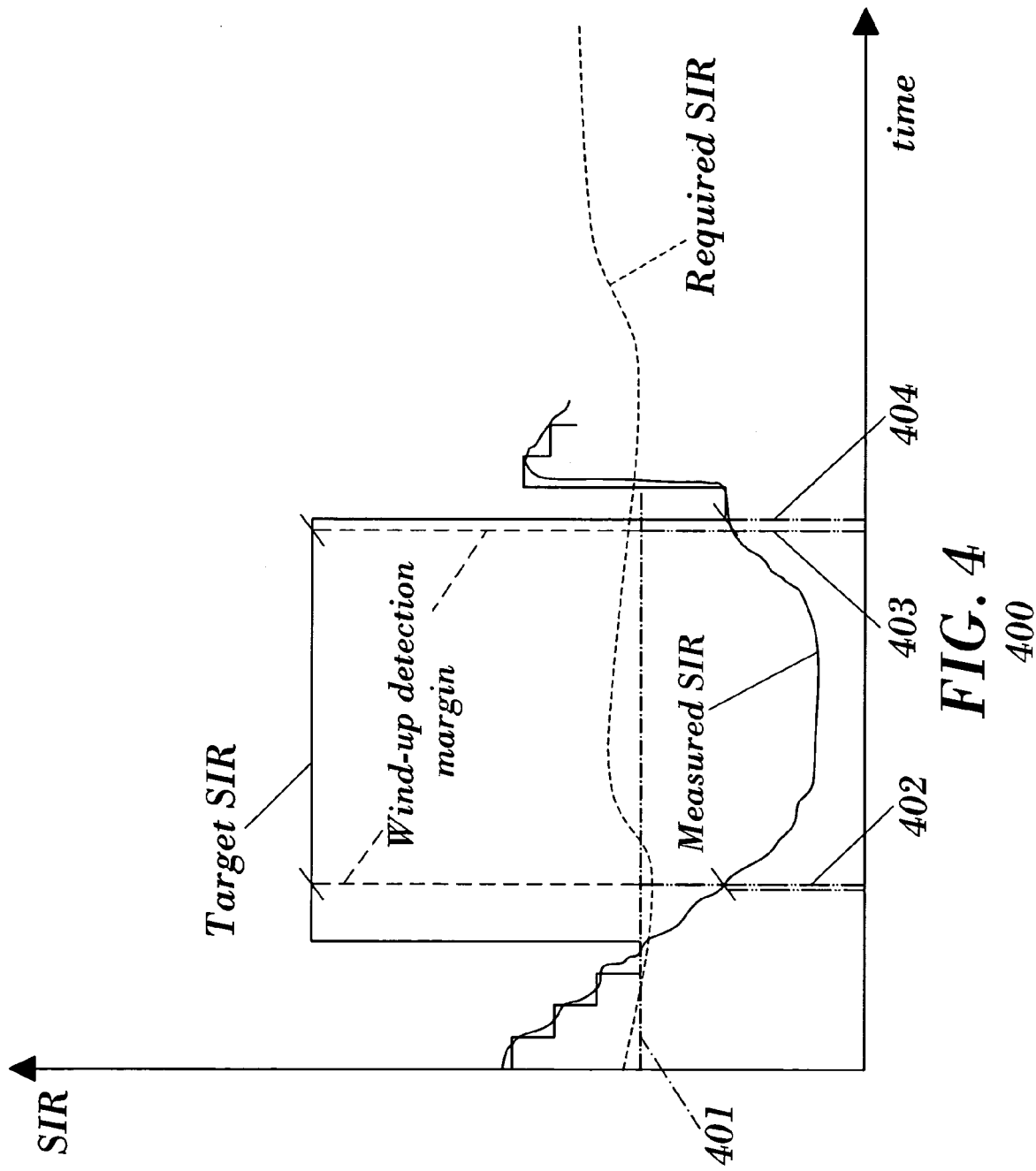
FIG. 4. Is a graph of the development of the desired signal to interference ratio target ($SIR_{target}$) in time, according to the possible undertaking of the invention method, by which there is a margin for detecting the wind-up mode that must be subtracted from the desired signal to interference ratio target ($SIR_{target}$) at the start of outer loop unwinding mode.

Referring now to FIG. 4, the last correct value (401) is considered to be that of before the wind-up situation. During the wind-up, the value of the desired signal to interference ratio target ($SIR_{target}$) is incorrect because the mechanisms that operate during the wind-up mode limit or cancel the outer loop power control so that the desired signal to interference ratio target ($SIR_{target}$) does not continue to grow indefinitely. FIG. 4 also shows, with a dotted line, the desired signal to interference ratio required ($SIR_{required}$), defined as a theoretical minimum of the desired signal to interference ratio received ($SIR_{rec}$) that satisfies the target frame error rate ($FER_{target}$). A continuous line also shows the desired signal to interference ratio measured ($SIR_{measured}$) which is the real estimate of the desired signal to interference ratio received ($SIR_{rec}$), made mainly by the controller (201) of the base or mobile station in the network radio.

To choose this last correct value (401) for the desired signal to interference ratio target ($SIR_{target}$), the invention's method proposes the following mechanism, preferentially applicable if the wind-up detection has been planned using a detection margin (M) between the desired signal to interference ratio target ($SIR_{target}$) and the desired signal to interference ratio received ($SIR_{rec}$), as specified in FIG. 4. In this case, the detection of the wind-up situation by the detector (302) occurs at the starting point (402) of the outer loop wind-up. Later, this detector (302) also determines the end of the wind-up mode and thus detects the starting point (403) of the unwinding. At this point (403), this mechanism reduces the desired signal to interference ratio target ($SIR_{target}$) by the same amount as the detection margin (M). This mechanism thus allows the value of the desired signal to interference ratio target ($SIR_{target}$) to return to a value that is very close to the original value (401) it had at the point before the start (402) of the wind-up.

As shown in the graph (400) in FIG. 4, at the point (404) immediately after the start (403) of the unwinding, the value of the desired signal to interference ratio target ($SIR_{target}$) obtained after subtracting the detection margin (M) from the value set (406) during the wind-up, which could be fixed or variable within a limit according to the wind-up mechanism applied, is slightly below the desired signal to interference ratio required ($SIR_{required}$), which implies a slight loss of quality in the channel, but this reduction of quality will be very short since, as already mentioned, the known stepping algorithm of the outer loop power control is very fast when it is necessary to increase the desired signal to interference ratio target ($SIR_{target}$). On the other hand, this slight, brief loss of quality is not noticed by the end user, since he has been with an even more degraded quality during his communication throughout the wind-up phenomenon, for example, if the user has entered a lift while talking on his mobile telephone. Any reduction that is greater or less than this detection margin (M) is considered covered by this invention.

The great advantage of the new unwinding mechanism that includes the method proposed for wireless communications systems is that it drastically reduces the convergence time of the outer loop power control on exiting the wind-up state and, thanks to it, prevents unnecessary interferences that reduce the system's capacity.

The above design has been used to describe the principles of the invention; however, other alternatives, although not detailed here but which incorporate the same spirit and purpose, are possible. For example, although the invention has been illustrated here with discrete functional blocks that can be run in the controller (201) of a wireless communications network, the functions of any of these blocks can be carried out using one or more suitably programmed processors.

In the same line, the invention is applicable to other standards apart from WCDMA, for power control of any signal received both by the base stations and by users' terminal equipment or mobile stations.

The terms in which this description has been prepared must always be taken in the wide and non-limiting sense.

What is claimed is:

1. Outer loop power control method for wireless communications systems, based on CDMA technology, the method comprising:
    estimating a desired signal to interference ratio received ($SIR_{rec}$) based on a data signal (107, 108) received from a base station (102, 103) or mobile station (104),
    setting a desired signal to interference ratio target ($SIR_{target}$) that is close to a signal to interference ratio required ($SIR_{rec}$) during the normal mode of the outer loop,
    detecting a start (402) of the outer loop wind-up,
    setting a specific desired signal to interference ratio target ($SIR_{target}$) during the outer loop wind-up, and
    detecting a start (403) of the outer loop unwinding,
    wherein the desired signal to interference ratio target ($SIR_{target}$) is modified at the start (403) of the outer loop unwinding, to match it to the outer loop power control in normal mode just prior to the start of the outer loop wind up.

2. Outer loop power control method for wireless communications systems, according to claim 1, wherein at the start (403) of the outer loop unwinding the desired signal to interference ratio target ($SIR_{target}$) is set to a value suitably close to the original value (401) set just before the start moment (402) of the outer loop wind-up.

3. Outer loop power control method for wireless communications systems, according to claim 1, wherein the start (402) of the outer loop windup is detected when the difference between the desired signal to interference ratio target ($SIR_{target}$) and the desired signal to interference ratio received ($SIR_{rec}$) exceeds a specific detection margin (M) of the outer loop wind-up.

4. Outer loop power control method for wireless communications systems, according to claim 3, wherein at the start (403) of the outer loop unwinding, the detection margin (M) is subtracted from the desired signal to interference ratio target ($SIR_{target}$) set at the start (402) of the windup detected in the outer loop.

5. An outer loop power control device for wireless communications systems, comprising at least one programmable electronic device, the programmable electronic device operable to perform the steps of:
   estimating a desired signal to interference ratio received ($SIR_{rec}$) based on a data signal (107, 108) received from a base station (102, 103) or mobile station (104),
   setting a desired signal to interference ratio target ($SIR_{target}$) that is close to a signal to a signal to interference ratio required ($SIR_{req}$) during the normal mode of the outer loop,
   detecting a start (402) of the outer loop wind-up,
   setting a particular desired signal to interference ratio target ($SIR_{target}$) during the outer loop wind-up, and
   detecting a start (403) of the outer loop unwinding,
   wherein the desired signal to interference target ($SIR_{target}$) is modified at the start (403) of the outer loop unwinding, to match it to the outer loop power control in normal mode just prior to the start of the outer loop wind up.

6. Outer loop power control device for wireless communications systems, according to claim 5, wherein the programmable electronic device is chosen from among a general purpose processor, a digital signal processor (DSP), an application-specific integrated circuit (ASCI) and a programmable card (FPGA) or any combination of these.

7. Outer loop power control device for wireless communications systems, according to claim 5, further comprising a radio receiver (203) able to receive a data signal (107, 108) from a base station (102, 103) or from a mobile station (104) of the wireless communication system.

8. Outer loop power control device for wireless communications systems, according to claim 5, further comprising a radio transmitter (202) able to send the power control information to a base station (102, 103) or to a mobile station (104) of the wireless communication system.

9. Outer loop power control device in a wireless communication system, according to claim 5, wherein the outer loop power control device is incorporated in a wireless communications network controller.

10. Outer loop power control device in a wireless communication system, according to claim 5, wherein the outer loop power control device is incorporated in a mobile station for wireless communications systems.

11. A radio network controller for wireless communications systems including the outer loop power control device according to claim 5.

12. Mobile station for wireless communications systems including the outer loop power control device according to claim 5.

* * * * *